United States Patent [19]

Fukuchi

[11] Patent Number: 4,489,803

[45] Date of Patent: Dec. 25, 1984

[54] REAR SUSPENSION SYSTEM FOR MOTORCYCLES

[75] Inventor: Kiyoshi Fukuchi, Saitama, Japan

[73] Assignee: Honda Giken Kogyo Kabushiki Kaisha, Tokyo, Japan

[21] Appl. No.: 426,258

[22] Filed: Sep. 29, 1982

[30] Foreign Application Priority Data

Oct. 14, 1981 [JP] Japan ............................ 56-163947

[51] Int. Cl.³ ............................................ B62K 25/20
[52] U.S. Cl. ................................... 180/227; 280/284
[58] Field of Search ............... 180/227, 219; 280/284

[56] References Cited

U.S. PATENT DOCUMENTS 4,415,057 11/1983 Yamaguchi ...................... 180/227

FOREIGN PATENT DOCUMENTS 488393 9/1918 France ............................ 280/284

Primary Examiner—Joseph F. Peters, Jr.
Assistant Examiner—D. Lynn Fugate
Attorney, Agent, or Firm—Irving M. Weiner; Pamela S. Burt; Anthony L. Cupoli

[57] ABSTRACT

A rear suspension system for motorcycles in which a front end of a rear wheel supporting member having the rear wheel supported thereby is connected to a chassis frame in such a manner as to permit oscillation thereof in an upward or downward direction, a damper having one end connected to the chassis frame is connected to the rear wheel supporting member at the other end thereof by a first link, and the chassis frame and the first link are connected by the second link. Due to an arrangement of the first link in which its longitudinal axis extends substantially in a vertical direction, a space occupied by the progressive link mechanism is made to be relatively small and thus it is possible to provide a sufficient space for units such as a battery and air cleaner and the like.

4 Claims, 5 Drawing Figures

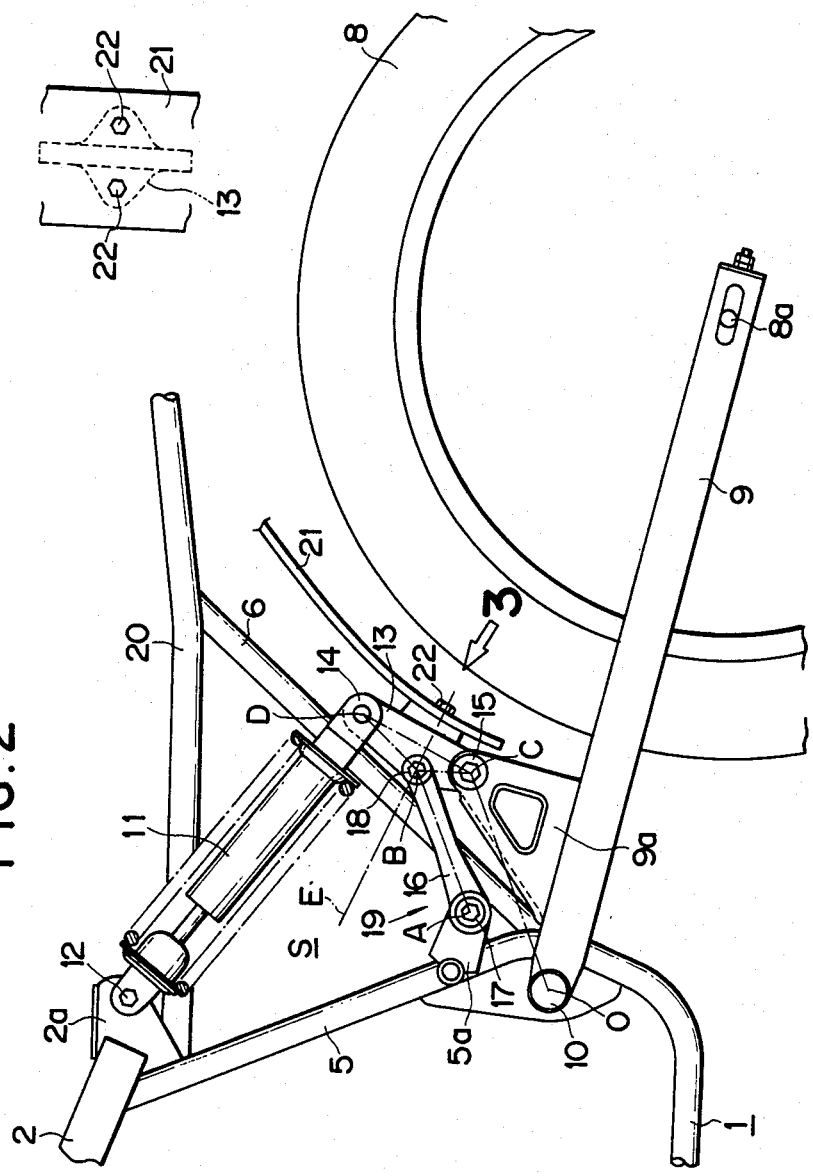

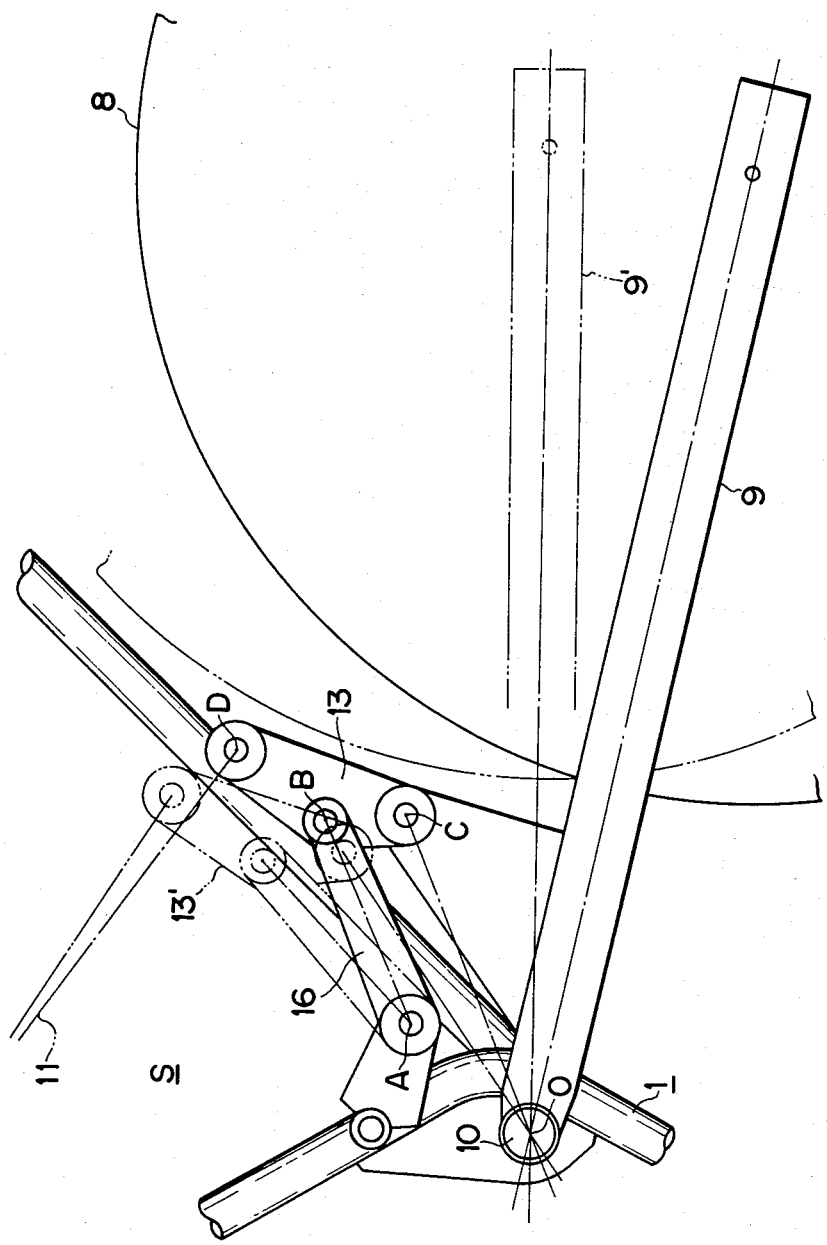

REAR SUSPENSION SYSTEM FOR MOTORCYCLES

BACKGROUND OF THE INVENTION

1. Field of the Invention

This invention relates to an improvement of a rear suspension system for motorcycles which is provided with a progressive linkage mechanism wherein a compression stroke of the damper for the rear wheel suspension is progressively increased against the oscillating stroke of a rear wheel supporting member.

2. Description of Relevant Art

It is well known in the art to provide a rear suspension system for motorcycles in which a rear wheel supporting member having its rear end supporting the rear wheel and its front end pivotally connected to the chassis frame, in such a manner that it may be oscillated in an upward or downward direction, absorbs and dampens the vertical oscillation caused by the rear wheel which is oscillated around the front wheel due to an uneven road surface. The damper has one end connected to the chassis frame and is connected to the rear wheel supporting member at the other end thereof by a first link, and the chassis frame is connected to the first link by a second link, whereby a progressive linkage mechanism including the first and second links is installed between the damper and the rear wheel supporting member. In such a rear suspension system as constructed by the progressive linkage mechanism, when the rear wheel supporting member is oscillated in an upward direction, the first link is rotated around the connecting part with the rear wheel supporting member by the second link while it is moved upwardly along with the rear wheel supporting member, and the damper is compressed by the first link. As a result, a compression stroke of the damper is progressively increased in a curve of secondary degree with respect to the oscillating stroke of the rear wheel supporting member and thus the characteristic of the dampening force may show a progressive performance.

Such a conventional type of rear suspension system as described above has been installed mainly in a motorcycle manufactured for off-road use on an uneven road surface, and if this system is applied to a motorcycle to be driven primarily on an even surface road, it is not preferable to install the conventional progressive linkage mechanism in the motorcycle in its unmodified form. That is, in a general type of on road motorcycle, a battery with a relatively large capacity and other bulky equipment such as an air cleaner are assembled in the chassis frame, so that it is preferable to assemble the progressive linkage mechanism in a small space in relation to these units requiring a large installation space and to make a compact sized construction to permit storing of the mechanism. Further, when a degree of rotation of the first link which is rotated while it is moved upwardly is relatively high, it is required to keep a space for allowing the first link to be moved, and as a result sizes of the units are substantially restricted.

The present invention effectively overcomes the above-mentioned disadvantages in applying the progressive link type rear suspension system to motorcycles for on-road use.

SUMMARY OF THE INVENTION

This invention provides a rear suspension system for motorcycles wherein a front end of a rear wheel supporting member is pivotally connected to a chassis frame in such a manner as it may be oscillated in an upward or downward direction, a damper having one end connected to the chassis frame is connected to the rear wheel supporting member at the other end thereof by a first link, the chassis frame is connected to the first link by a second link, and the first link is so arranged that a longitudinal axis of the first link at its side extends substantially in a vertical direction.

It is an object of the present invention to provide a rear suspension system for motorcycles including a progressive link mechanism which is made to be compact in size and requires a relatively small space in particular for storing the progressive link mechanism, and thus provides an installation space for the surrounding equipment such as a battery and an air cleaner and the like.

Referring now to the drawings, one preferred embodiment of the present invention will be described in more detail, from which, further advantages, objects, and features of the present invention will become more apparent.

BRIEF DESCRIPTION OF THE DRAWINGS

FIG. 2 is an enlarged view showing a principal part of FIG. 1.

FIG. 3 is a view taken along an arrow of FIG. 2.

FIG. 4 is a side elevational view for showing an operation of the progressive linkage mechanism.

DETAILED DESCRIPTION OF THE PREFERRED EMBODIMENT

Figure 1:
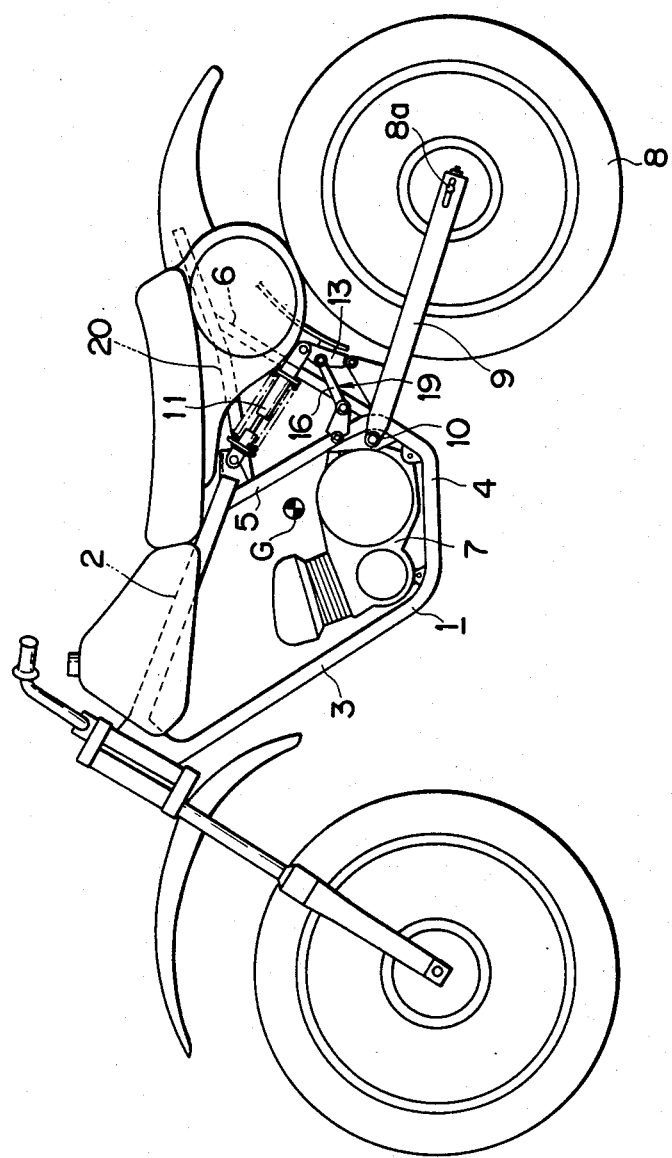
FIG. 1 is an overall side elevational view of a motorcycle.

Referring now to FIGS. 1 to 4, reference numeral 1 in FIG. 1 indicates a chassis frame of the motorcycle which is designed for on-road use. The chassis frame 1 is constructed by a main frame 2, a down tube 3, a bottom frame 4, a rear frame 5 and sub-frame 6 and the like, and the engine 7 is mounted on the bottom frame 4. Wheel shaft 8a of the rear wheel 8 is supported at the rear end of the rear fork 9, and the front end of the rear fork 9 which acts as a supporting member for the rear wheel is pivotally connected to the chassis frame 1 by a pivot shaft 10 in such a manner as to permit swinging thereof in an upward or downward direction. The shock absorber 11 for the rear wheel comprises a combined assembly of a spring, and a pneumatic or hydraulic damper or a pneumatic and hydraulic combined damper, and the front end of the damper 11 is connected to a bracket 2a connected to the rear end of the main chassis frame 2, as shown in FIG. 2, by a pivot shaft 12 in such a manner as to permit swinging thereof in an upward or a downward direction, the damper 11 extending rearwardly downwardly. One unit of the damper 11 is arranged at a central part of the width of the motorcycle chassis or at a point near to the central part, i.e. such position, as shown in FIG. 1, being near a center of gravity G of the motorcycle which is located near the engine 7, so that the moment of inertia around the center of gravity G of the motorcycle is reduced.

As shown in FIG. 2, a bracket 9a is projected on the upper front surface of the rear fork 9, the rear end of the damper 11 which is obliquely arranged to face upwardly and the bracket 9a are connected by a first link 13, the rear end of the damper 11 is connected to the upper end of the longitudinal side link 13 by the shaft 14, and the lower end of the first link 13 is connected to the rear fork 9 through the bracket 9a by the shaft 15. To the rear frame 5 is connected a bracket 5a which is projected rearwardly, the bracket 5a and a substantial vertical intermediate part of the first link 13 being connected by the second link 16. The front end of the second link 16 is connected to the bracket 5a by a shaft 17 and the rear end of the second link 16 is connected to a substantially intermediate part of the first link 13 by a shaft 18.

The progressive link mechanism 19 comprises the first and second links 13 and 16 each of which is arranged over the rear fork 9. The units (not shown) required for operating the motorcycle such as a battery and an air cleaner and the like are placed in a space S below the seat rail frame 20 which is rearward of the rear frame 5 and extends from the upper end of the rear frame 5 to a rear part of the chassis. The first link 13 has a substantially straight side surface and is arranged with a longitudinal axis thereof at its side extending substantially in a vertical direction. Thus, the first link 13 substantially does not affect the space S used as an installation space for units such as a battery and the like, and therefore, it is not necessary to restrict the size of such a unit installed in the chassis by the first link 13. In the example shown in the drawings, the connecting part B between the first link 13 and the second link 16 defined by the shaft 18 is positioned in a part of the chassis slightly forwardly of a line C-D connecting the connecting part C between the rear fork 9 and the first link 13 defined by the shaft 15 and a connecting part D between the damper 11 and the first link 13 defined by the shaft 14. The connecting part B is disposed relatively near to the line C-D and the line C-B-D is substantially straight, so that the first link 13 may be made to have a small side area. The connecting part B may be placed on the line C-D in order to make an area of the first link 13 as small as possible and to maintain an installation space for the aforesaid units as large as possible.

The connecting part A between the chassis frame 1 and the second link 16 defined by the shaft 17 is disposed below the line E passing through the connecting part B and crossing with the line C-D at a right angle, and the second link 16 is obliquely declined forwardly, so that a degree of the second link 16 projecting into the space S is relatively restricted to be as small as possible. In addition to this operational relation, a normal position of the connecting part B is disposed substantially at the vertical intermediate part of the first link 13, so that the second link 16 is disposed relatively near to the rear fork 9 and the progressive link mechanism 19 is made to be compact in size due to the close approach of the second link 16 to the rear fork 9, and in view of the above-mentioned construction, a relatively bulky unit and the like may be assembled in the space S.

As also shown in FIG. 2, the damper 11, first link 13 and second link 16 are all disposed above a line (0–8a) extending between the connecting part 0 (at which the chassis frame is connected with the rear fork) and the rear end of rear fork 9 supporting the rear wheel.

In the preferred embodiment of the present invention, the line O-C connecting the connecting part O between the chassis frame 1 and the rear fork 9 defined by the pivot shaft 10 to the connecting part C is substantially parallel at its side with the line A-B connecting the connecting parts A and B, i.e., an axial line of the second link 16. Due to this fact, as shown in FIG. 4, if the rear fork 9 is oscillated upwardly as shown by the dotted line 9' around the pivot shaft 10 along with the rear wheel 8 due to an uneven road surface, and then the first link 13 is moved upwardly, the first link 13 is rotated in a counter-clockwise direction as viewed in FIG. 4 around the connecting part C, even though the progressive link mechanism 19 is substantially a parallel link mechanism, so that a degree of rotation of the first link 13 is less than that of the conventional type of the progressive link mechanism and the first link 13 is moved substantially in a parallel direction to the position of the dotted line 13'. Due to this relation, the present invention requires only a small space for movement of the first link 13 compared with that of the conventional type of progressive link mechanism in which a relatively large space is required for the first link to perform a combined movement of the upward movement with the upward oscillation of the rear fork and a wide rotation of the same, resulting in that it is possible to arrange a unit having a relatively large size in the space S. As described above, when the line O-C and the line A-B are substantially parallel to each other at their sides and the first link 13 is moved substantially in a parallel direction, a positional relation between the first link 13 and the rear wheel 8 is kept substantially constant throughout the deforming operation of the progressive link mechanism 19 caused by an upward or downward oscillation of the rear fork 9, so that as shown in FIGS. 2 and 3 at least a front half part of the rear fender 21 may be fixed to the rear surface of the first link 13 by a pair of bolts 22 or other fastening means to prevent mud splashed from the rear wheel 8 from adhering to the progressive link mechanism 19 by the rear fender 21.

Figure 5:
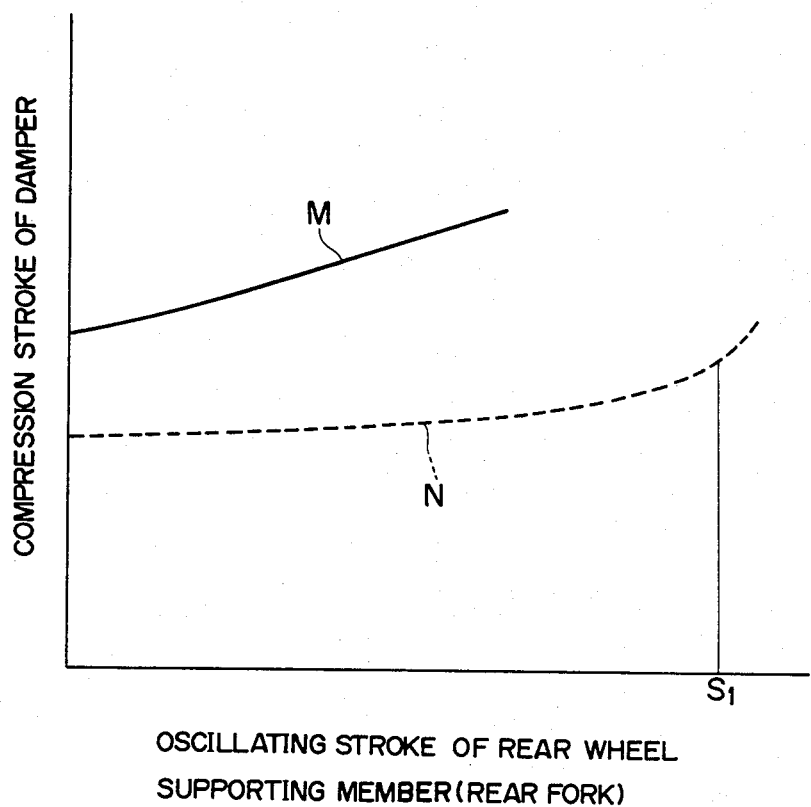
FIG. 5 is a graph comparing shock absorbing performance of a conventional system with that of the progressive linkage mechanism applied in the present invention.

With reference to FIG. 5, when the rear suspension system is provided with the progressive link mechanism 19, the damper 11 is compressed by the first link 13 to generate a dampening force against the movement of the rear wheel 8 caused by an uneven road surface and the oscillation of the rear fork 9. However, in a conventional type of progressive link mechanism applied mainly to an off road motorcycle, the dampening force is relatively small to effect a soft cushioning in a range of a low oscillation stroke of the rear fork and in turn to increase the dampening force in a range of a large oscillating stroke in which the damper approaches the so-called lowermost condition, so that a degree of rotation of the first link is made to be a high value to get a performance of dampening force N. However, an on-road motorcycle has a lesser oscillating stroke of the rear fork than that of an off-road motorcycle, so that if the conventional type of progressive link mechanism is applied to an on-road motorcycle in its unmodified form, the rear fork may reach the limit of the oscillating movement by the time it has reached the oscillating stroke $S_1$ in which there is provided a cushioning performance suitable for driving on a paved road.

The reason for keeping a low dampening force in a range of low oscillating stroke of the rear fork in an off road motorcycle resides in the maintenance of the superior driving performance on a relatively rough road surface. However, in case of an on-road motorcycle, since the above-mentioned performance is not substantially required and an oscillating stroke of the rear fork of the on-road motorcycle to be is generally lower than that of the off-road motorcycle, it is preferable to provide a higher compression stroke of the damper in the on-road motorcycle in respect to the unit oscillation stroke of the rear fork than that of the off-road motorcycle. Such preferable performance of dampening force is indicated by M in the graph of FIG. 5.

In the device of the preferred embodiment which may be preferably applied to the on-road motorcycle, the first link 13 is moved in a substantially parallel direction as described above so as to compress the damper unit 11. Although the compression stroke of the damper may be related to size and condition of the arrangement of the first and second links 13 and 16, the compression stroke in respect to the unit oscillating stroke of the rear fork 9 may be made a relatively large value, and thus the performance of the dampening force M may substantially be realized which will be understood as being a remarkable advantage of the preferred embodiment of the present invention in which the first link 13 is moved substantially in a parallel direction.

I claim:

1. In a rear suspension system for motorcycles comprising a chassis frame of said motorcycle, a rear wheel, a member supporting said rear wheel at its rear end and pivotally connected to said chassis frame at its front end in such a manner as to permit oscillation thereof in upward and downward directions, a damper having one end connected to said chassis frame, a first link connecting the other end of said damper to said rear wheel supporting member, and a second link connecting said first link to said chassis frame, the improvement wherein:

said first link is arranged such that a longitudinal axis of said first link at its side extends substantially in a vertical direction;

said first link and said second link are arranged such that a line led from a first connecting part (O) between said chassis frame and said rear wheel supporting member to a second connecting part (C) between said first link and said rear wheel supporting member is substantially parallel at its side with another line led from a third connecting part (A) between said chassis frame and said second link to a fourth connecting part (B) between said first and second links;

said damper, said first link and said second link are disposed above a line extending between said first connecting part and the rear end of said rear wheel supporting member;

said damper is pivotally connected at the front end thereof to said chassis frame, extends rearwardly downwardly, and is pivotally connected at the rear end thereof to the upper end of said first link at a fifth connecting part (D);

said second link is pivotally connected at the front end thereof to said chassis frame at said third connecting part, and is pivotally connected at the rear end thereof to a substantially intermediate part of said first link at said fourth connecting part; and said first link is pivotally connected at the lower end thereof to said rear fork at said second connecting part.

2. A rear suspension for motorcycles according to claim 1, wherein:

said fourth connecting part is offset forwardly from a line extending between said second connecting part and said fifth connecting part.

3. A rear suspension system for motorcycles according to claim 1, wherein:

said third connecting part is disposed below a line passing through said fourth connecting part and crossing at a right angle a line extending between said second connecting part and said fifth connecting part.

4. A rear suspension system for motorcycles according to claim 3, wherein:

said second link is obliquely declined forwardly and downwardly.

* * * * *